Patented May 9, 1933

1,908,064

UNITED STATES PATENT OFFICE

ERWIN SCHWENK, OF BERLIN-WESTEND, AND ERICH BORGWARDT, OF BERLIN-PANKOW, GERMANY, ASSIGNORS TO SCHERING-KAHLBAUM A. G., OF BERLIN, GERMANY

PRODUCTION OF CAMPHENE

No Drawing. Application filed May 9, 1931, Serial No. 536,308, and in Germany May 26, 1930.

Our invention relates to the production of camphene, more especially from bornyl halides and has for its object to provide means for operating the production of camphene from this starting material in a more efficient manner than was hitherto possible.

The decomposition of bornyl halides to split off hydrochloric acid or the like and recover camphene has hitherto been carried out by heating the bornyl halides with an alkali earth metal compound, for instance milk of lime or calcium phenolate, under pressure.

It has further been suggested to produce camphene in a continuous manner by passing bornyl chloride vapor over cupric oxide.

We have now found that a particularly good yield is obtained if the bornyl halide vapor is made to react with the alkaline earth metal compounds in the presence of steam, the solid compounds being conducted in countercurrent to the vapors. In proceeding in this manner we cause the hydrogen halide split off the halides to combine with the alkaline earth metal compound, while the camphene formed in the reaction is carried away by the steam. In consequence thereof the halides remain in contact with the alkaline earth metal compounds only a very short time so that undesirable secondary reactions are avoided.

We have succeeded in producing a camphene of particular purity, which after having been dried, can be used without previous purification for the conversion into bornyl ester etc. If care is taken to provide for a continuous supply of fresh alkali earth metal compound and a continuous removal of chloride formed in the reaction, the process can easily be carried out in a continuous manner.

Example 1

Steam having a temperature of about 200° C. is passed through a vessel containing 100 parts by weight molten bornyl chloride. The vapor mixture thus obtained is conducted into a tube, heated to about 200° C., in which hydrate of lime or calcium carbonate is slowly moved, by a screw conveyer or the like, in countercurrent to the vapor current. The camphene vapor escaping together with the steam is condensed in a suitable condenser and the camphene, which solidifies for the greater part, is isolated. We have thus obtained 77 parts by weight camphene, which after having been subjected once to distillation, melts at 45° C.

The same reaction can also be carried out with technical crude pinene hydrochloride obtainable by introducing hydrochloric acid gas into pinene.

Example 2

Steam having a temperature of about 200° C. is conducted through a vessel containing 100 parts by weight molten bornyl bromide. The resulting vapor mixture is conducted through a tube heated to about 250° C., in which magnesia or magnesium carbonate is slowly moved, by a screw conveyer or otherwise, in a direction counter to the vapor current. The vapors escaping through this tube are condensed and the camphene separating out (about 60%) is purified by distillation. The solidified distillate melts at 45° C.

Various changes may be made in the details disclosed in the foregoing specification without departing from the invention or sacrificing the advantages thereof.

We claim:

1. The method of recovering camphene from a bornyl halide comprising conducting a mixture of bornyl halide vapor and steam in contact with a basic alkali earth metal compound moving in a direction counter to that of the vapor mixture.

2. The method of producing camphene comprising conducting a mixture of bornyl chloride and superheated steam in contact with a basic calcium compound moving in countercurrent to the vapor mixture, and causing condensation of the camphene vapor forming in the reaction.

3. The method of producing camphene comprising conducting a mixture of bornyl bromide vapor and superheated steam in contact with a heated basic magnesium compound moving in countercurrent to the vapor mixture, and causing condensation of the camphene vapor forming in the reaction.

In testimony whereof we affix our signatures.

ERWIN SCHWENK.
ERICH BORGWARDT.